(12) United States Patent
Kassar et al.

(10) Patent No.: US 11,584,014 B2
(45) Date of Patent: Feb. 21, 2023

(54) ROBOTIC APPARATUS FOR VEHICLE OCCUPANT PROTECTION

(71) Applicant: Ford Global Technologies, LLC, Dearborn, MI (US)

(72) Inventors: Sari Kassar, Plymouth, MI (US); Tony Tae-Jin Pak, Garden City, MI (US); Sarra Awad Yako, Allen Park, MI (US); Mark Douglas Malone, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 483 days.

(21) Appl. No.: 16/750,725

(22) Filed: Jan. 23, 2020

(65) Prior Publication Data
US 2021/0229288 A1    Jul. 29, 2021

(51) Int. Cl.
| | | |
|---|---|---|
| *B25J 19/02* | (2006.01) | |
| *B25J 9/16* | (2006.01) | |
| *B25J 5/00* | (2006.01) | |
| *B25J 15/00* | (2006.01) | |
| *A62B 18/02* | (2006.01) | |
| *A62C 3/07* | (2006.01) | |

(52) U.S. Cl.
CPC .............. *B25J 9/1694* (2013.01); *B25J 5/00* (2013.01); *B25J 15/0019* (2013.01); *B25J 19/02* (2013.01); *B25J 19/023* (2013.01); *A62B 18/02* (2013.01); *A62C 3/07* (2013.01)

(58) Field of Classification Search
CPC ....... B60R 99/00; B25J 19/02; B25J 15/0019; B25J 19/023; B25J 9/1694; B25J 5/00; A62C 3/07; A62B 25/00; A62B 3/005; A62B 18/02
See application file for complete search history.

(56) References Cited

U.S. PATENT DOCUMENTS

| | | | |
|---|---|---|---|
| 10,928,830 B1 * | 2/2021 | Tran | G05D 1/0088 |
| 10,955,855 B1 * | 3/2021 | Tran | G05D 1/0246 |
| 2019/0047462 A1 | 2/2019 | Vijayaraghavan et al. | |

(Continued)

FOREIGN PATENT DOCUMENTS

| | | |
|---|---|---|
| CN | 108538013 A | 9/2018 |
| JP | 4506016 B2 | 7/2010 |

OTHER PUBLICATIONS

Teller et al., A voice-commandable robotic forklift working alongside humans in minimally-prepared outdoor environments, 2010, IEEE, p. 526-533 (Year: 2010).*

(Continued)

*Primary Examiner* — McDieunel Marc
(74) *Attorney, Agent, or Firm* — Frank A. MacKenzie; Bejin Bieneman PLC

(57) ABSTRACT

An apparatus includes a robot body, at least one sensor coupled to the robot body and positioned to receive stimuli from a passenger cabin of a vehicle, an actuatable component coupled to the robot body, and a computer coupled to the robot body and communicatively coupled to the sensor and the actuatable component. The computer is programmed to predict an imminent anomalous event in the vehicle based on data from the at least one sensor, and in response to the determination, actuate the actuatable component to remediate the anomalous event.

20 Claims, 5 Drawing Sheets

(56) References Cited

U.S. PATENT DOCUMENTS

| | | | |
|---|---|---|---|
| 2019/0061663 A1 | 2/2019 | Benmimoun et al. | |
| 2020/0344602 A1* | 10/2020 | Li | H04L 67/125 |
| 2021/0108926 A1* | 4/2021 | Tran | G06N 3/04 |
| 2022/0052329 A1* | 2/2022 | Gerasopoulos | H01M 10/0525 |
| 2022/0134547 A1* | 5/2022 | Cristache | B25J 13/08 |
| | | | 700/245 |

OTHER PUBLICATIONS

Fridman et al., MIT Advanced Vehicle Technology Study: Large-Scale Naturalistic Driving Study of Driver Behavior and Interaction With Automation, 2019, IEEE, p. 102021-102038 (Year: 2019).*

On-Bar et al., Looking at Humans in the Age of Self-Driving and Highly Automated Vehicles, 2016, IEEE, 90-104 (Year: 2016).*

Guo et al., RoboADS: Anomaly Detection Against Sensor and Actuator Misbehaviors in Mobile Robots, 2018, IEEE, p. 574-585 (Year: 2018).*

Paukert, Rinspeed Snap is a wild self-driving ecosystem for CES, Dec. 6, 2017; Road/Show by CNET.

* cited by examiner

ROBOTIC APPARATUS FOR VEHICLE OCCUPANT PROTECTION

BACKGROUND

Vehicles are typically equipped with impact sensors, which are adapted to detect an impact to the vehicle. Types of impact sensors include post-contact sensors such as linear or angular accelerometers, gyroscopes, pressure sensors, and contact switches; and pre-impact sensors such as radar, lidar, and vision-sensing systems. The vision systems can include one or more cameras, CCD image sensors, CMOS image sensors, etc. Impact sensors are attached to a vehicle at numerous points in or on the vehicle. Other components of a vehicle can be triggered by a signal from an impact sensor, including airbags, seatbelt pretensioners, etc.

DETAILED DESCRIPTION

Figure 1:
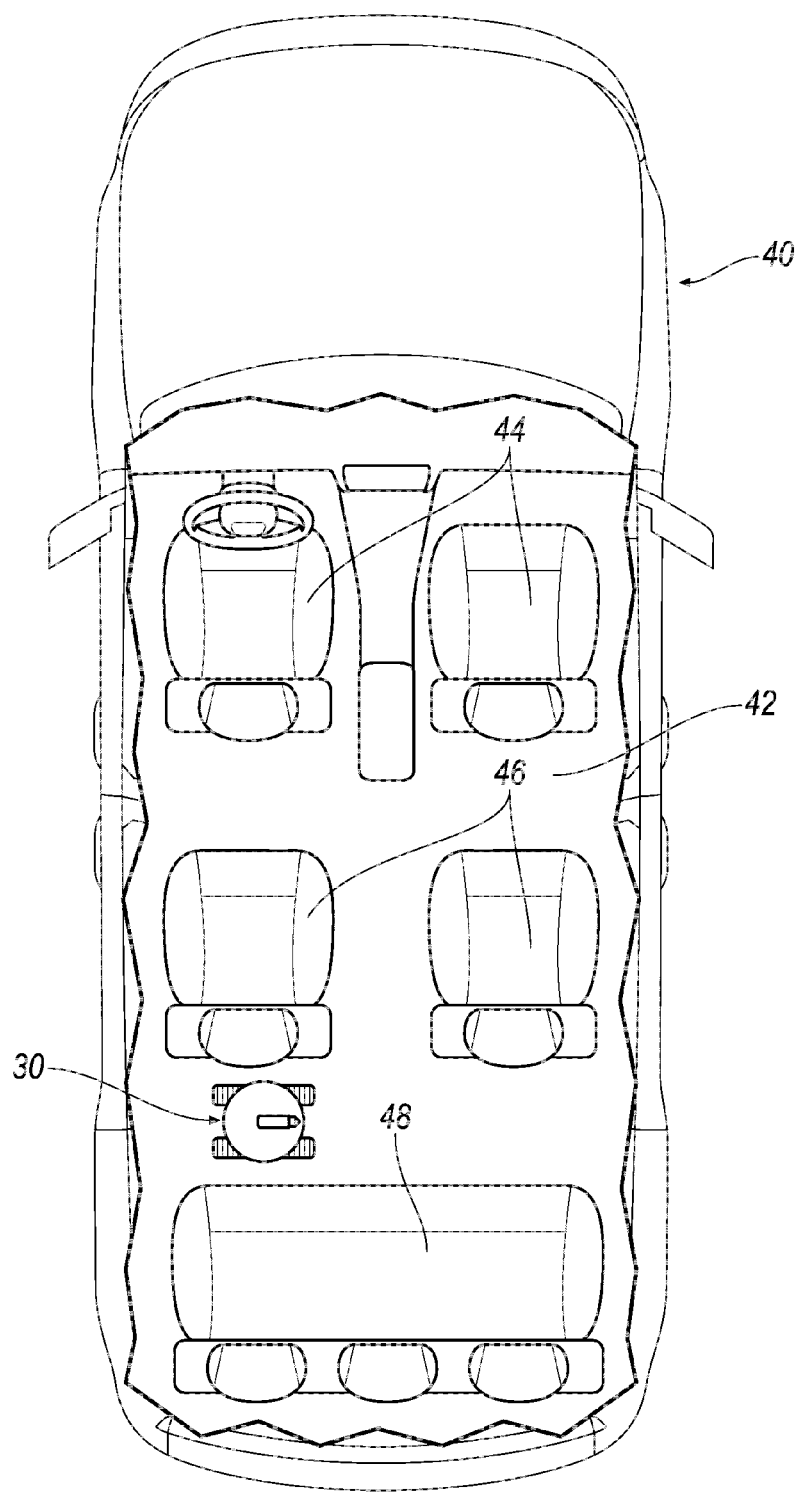
FIG. 1 is a top view of an example vehicle with a passenger cabin exposed for illustration.

An apparatus includes a robot body, at least one sensor coupled to the robot body and positioned to receive stimuli from a passenger cabin of a vehicle, an actuatable component coupled to the robot body, and a computer coupled to the robot body and communicatively coupled to the sensor and the actuatable component. The computer is programmed to predict an imminent anomalous event in the vehicle based on data from the at least one sensor, and in response to the prediction, actuate the actuatable component to remediate the anomalous event.

Remediating the anomalous event may include providing an exit for occupants from the passenger cabin.

Remediating the anomalous event may include extinguishing a fire.

The apparatus may be unattached to the vehicle.

The apparatus may further include a locomotion component coupled to the robot body. The locomotion component may include at least one of wheels, tracks, or legs.

The actuatable component may include a fire extinguisher.

The actuatable component may include an actuator and a striker movable by the actuator relative to the robot body, and the actuator may be equipped to move the striker at a sufficiently high speed relative to the robot body to break tempered glass.

The apparatus may further include a plurality of breathing masks detachably attached to the robot body.

The at least one sensor may include a temperature sensor.
The at least one sensor may include a smoke detector.
The apparatus may further include a transceiver coupled to the robot body and communicatively coupled to the computer, and the at least one sensor may include a camera, and the computer may be further programmed to instruct the transceiver to transmit data received from the camera to a remote server. The computer may be further programmed to instruct the transceiver to transmit the data received from the camera to the remote server in real time.

The computer may be further programmed to, in response to a message from the remote server, actuate the actuatable component to provide an exit for occupants from the passenger cabin or to extinguish a fire.

The apparatus may further include a battery coupled to the robot body and electrically coupled to the computer, the at least one sensor, and the actuatable component.

A computer includes a processor and a memory storing instructions executable by the processor to predict an imminent anomalous event in the vehicle based on data received from at least one sensor mounted to an apparatus in a passenger cabin of the vehicle, wherein the apparatus is unattached to the vehicle; and in response to the prediction, actuate an actuatable component of the apparatus to remediate the anomalous event.

An apparatus includes a robot body; means for moving the robot body around inside a passenger cabin of a vehicle; means, mounted to the robot body, for predicting an imminent anomalous event in the vehicle; means, mounted to the robot body, for remediating the anomalous event; and a computer programmed to, upon predicting the imminent anomalous event, activate the means for remediating the anomalous event.

The apparatus may further include means for protecting occupants of the passenger cabin from smoke.

The means for moving the robot body around may be independent of the vehicle, the means for predicting the imminent anomalous event may be independent from the vehicle, and the means for remediating the anomalous event may be independent from the vehicle.

With reference to the Figures, an apparatus 30 includes a robot body 32, at least one sensor 34 coupled to the robot body 32 and positioned to receive stimuli from a passenger cabin 42 of a vehicle 40, an actuatable component 36 coupled to the robot body 32, and a computer 38 coupled to the robot body 32 and communicatively coupled to the sensor 34 and the actuatable component 36. The computer 38 is programmed to predict an imminent anomalous event in the vehicle 40 based on data from the at least one sensor 34, and in response to the determination, actuate the actuatable component 36 to address, e.g., remediate, the anomalous event.

The apparatus 30 can be actuated to help occupants of the vehicle 40 in response to an anomalous event. The apparatus 30 can act independently of the vehicle 40. For example, the apparatus 30 has sensors 34 that can provide redundancy with sensors of the vehicle 40. For another example, the apparatus 30 can act even if components of the vehicle 40 are disabled by the anomalous event. Furthermore, the apparatus 30 can perform actions that are useful after an anomalous event, such as extinguishing a fire or providing an exit from the vehicle 40. The apparatus 30 may be particularly helpful for vulnerable occupants such as children or people with disabilities. The apparatus 30 can predict the anomalous event before the anomalous event occurs, permitting a faster response to the anomalous event.

With reference to FIG. 1, the vehicle 40 may be any passenger or commercial automobile such as a car, a truck, a sport utility vehicle, a crossover, a van, a minivan, a taxi, a bus, etc.

The vehicle 40 includes the passenger cabin 42 to house occupants of the vehicle 40. The passenger cabin 42 includes one or more front seats 44 disposed at a front of the passenger cabin 42 and one or more back seats 46 disposed behind the front seats 44. The passenger cabin 42 may also include third-row seats 48 at a rear of the passenger cabin 42. In FIG. 1, the front seats 44 and back seats 46 are shown to be bucket seats, and the third-row seats 48 are shown to be bench seats, but the seats 44, 46, 48 may be other types. The position and orientation of the seats 44, 46, 48 and components thereof may be adjustable by an occupant.

The apparatus 30 is positioned inside the passenger cabin 42. The apparatus 30 can rest in a preset resting position. The resting position can be chosen to provide the sensors 34 of the apparatus 30 a field of view through windows of the vehicle 40 and to minimize obstruction of occupants of the vehicle 40. For example, the apparatus 30 may rest on a floor of the passenger cabin 42, as shown in FIG. 1. For another example, the apparatus 30 may rest on one of the seats 44, 46, 48.

The apparatus 30 is separate from and unattached to the vehicle 40. The apparatus 30 can freely move around the passenger cabin 42 and can act independently of the vehicle 40. All the components of the apparatus 30 are independent of the vehicle 40. The apparatus 30 thus provides protections for occupants, described below, in addition to and redundant of what the vehicle 40 provides.

Figure 2:
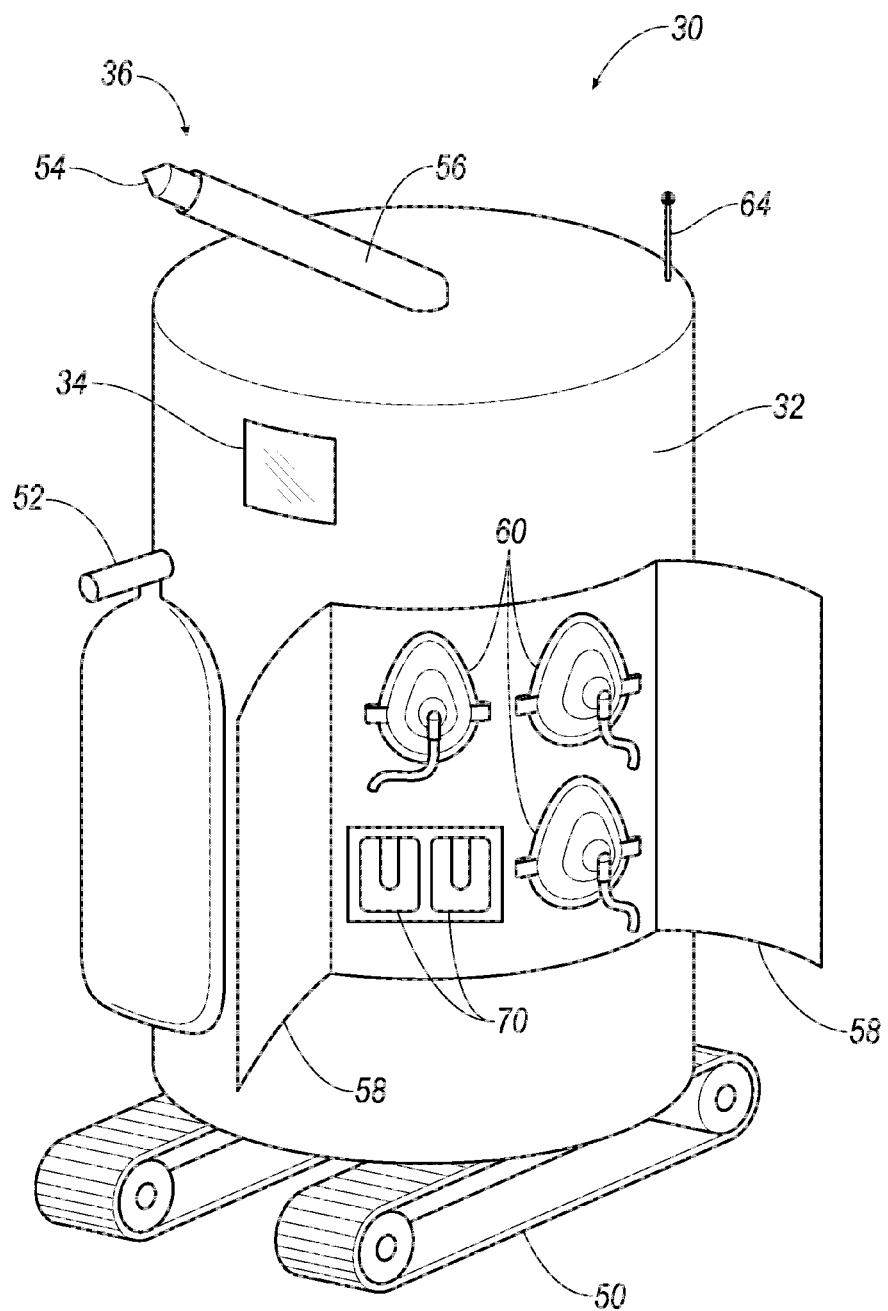
FIG. 2 is a perspective view of a robotic apparatus disposed in the passenger cabin.

With reference to FIG. 2, the apparatus 30 includes the robot body 32. The robot body 32 can be a rigid frame and/or rigid shell to house and/or provide a mounting point for other components of the apparatus 30. As shown in FIG. 2, the robot body 32 can have a generally cylindrical shape, but other shapes are also possible.

The apparatus 30 includes a locomotion component 50 coupled to the robot body 32. The locomotion component 50 is operable to move the apparatus 30 around the passenger cabin 42. For example, the locomotion component 50 can include tracks, as shown in FIG. 2. Alternatively or additionally, the locomotion component 50 can include wheels or legs. The locomotion component 50 can move around in the passenger cabin 42 by, e.g., traveling along a floor of the passenger cabin 42. The floor of the passenger cabin 42 can be flat to accommodate movement by the apparatus 30, and spaces can exist within each row of seats 44, 46, 48 except for the rearmost row, e.g., between the front seats 44 and between the back seats 46, as shown in FIG. 1. The apparatus 30 can be positioned so that the apparatus 30 is out of the way of the occupants unless needed.

The apparatus 30 can include a plurality of the sensors 34. The sensors 34 are positioned to receive stimuli from the passenger cabin 42 of the vehicle 40. The sensors 34 include a temperature sensor. The temperature sensor detects a temperature of a surrounding environment or an object in contact with the temperature sensor. The temperature sensor may be any device that generates an output correlated with temperature, e.g., a thermometer, a bimetallic strip, a thermistor, a thermocouple, a resistance thermometer, a silicon bandgap temperature sensor, etc. The sensors 34 include a smoke detector. The smoke detector can be any suitable type, e.g., ionization, photoelectric, aspirating, laser, etc. The sensors 34 can include detectors for other type(s) of toxic gas, such as fumes from a failure of batteries of the vehicle 40. The sensors 34 can include pressure sensors to detect an air pressure of the passenger cabin 42. The sensors 34 include one or more cameras. The cameras can detect electromagnetic radiation in some range of wavelengths. For example, the cameras may detect visible light, infrared radiation, ultraviolet light, or some range of wavelengths including visible, infrared, and/or ultraviolet light. The cameras are positioned on the robot body 32 so that when the apparatus 30 is in the resting position, the cameras have a field of view through the windows of the vehicle. The sensors 34 can include a microphone. The sensors 34 may include sensors for detecting the location and/or orientation of the apparatus 30. For example, the sensors 34 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers.

At least one actuatable component 36 is coupled to the robot body 32. An actuatable component 36 can be actuated by the computer 38 to perform a task. Actuatable components 36 can include, for example and without limitation, a fire extinguisher 52, a striker 54 and actuator 56, automatic doors 58 concealing breathing masks 60, and a gas supply 62 for supplying the breathing masks 60.

The fire extinguisher 52 includes a pressure vessel storing expellant and firefighting agent and a nozzle through which the expellant and firefighting agent can be directed. The computer 38 can actuate the fire extinguisher 52 to allow the expellant to force the firefighting agent through the nozzle. The fire extinguisher 52 can use any suitable expellant, e.g., compressed nitrogen or carbon dioxide, and any suitable firefighting agent, e.g., dry chemicals such as monoammonium phosphate, sodium bicarbonate, etc.; foams; water; wet chemicals; etc.

The striker 54 and actuator 56 are actuatable to break out one of the windows of the vehicle 40. The striker 54 and actuator 56 are mounted to the robot body 32, e.g., as shown in FIG. 2, on a top of the robot body 32. The striker 54 is movable by the actuator 56. The actuator 56 is equipped to move the striker 54 at a sufficiently high speed relative to the robot body 32 to break tempered glass. For example, the actuator 56 can be a compressed gas chamber releasable to launch the striker 54 out of a tube.

The illustrated apparatus 30 includes a plurality of the breathing masks 60. The breathing masks 60 can be concealed by the automatic doors 58, which are openable to reveal the breathing masks 60 if needed. For example, the automatic doors 58 can be opened by actuatable solenoids. The breathing masks 60 can be removed by occupants of the vehicle 40 to supply oxygen in the case of poor air quality inside the passenger cabin 42. The breathing masks 60 are shaped to cover a mouth and nose of an occupant. The gas supply 62 can supply the breathing masks 60 with breathable air, e.g., compressed oxygen. The apparatus 30 can further include a defibrillator 70 that is concealed by the automatic doors 58.

Figure 3:
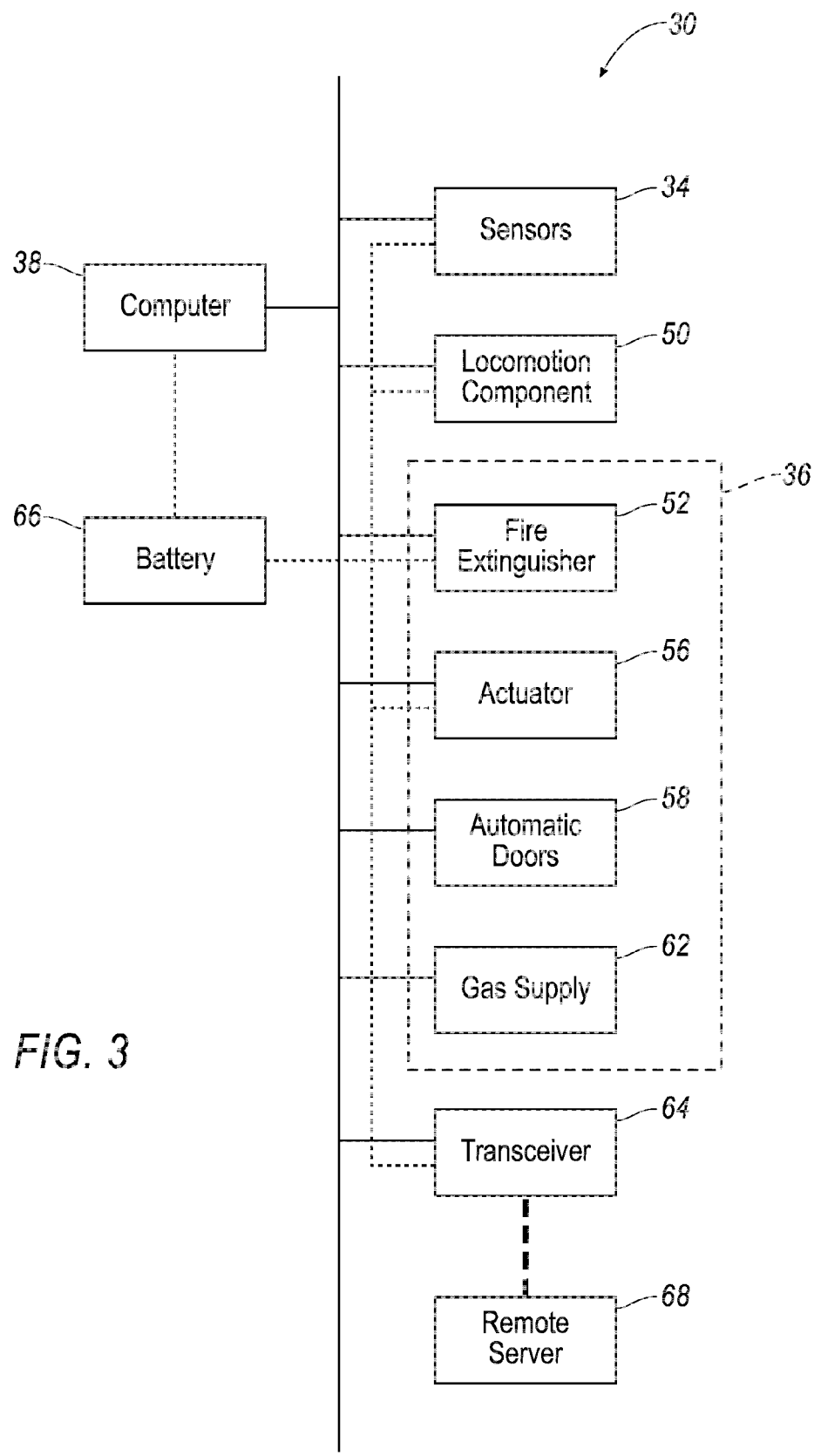
FIG. 3 is a block diagram of the robotic apparatus.

With reference to FIG. 3, the computer 38 is a microprocessor-based computing device, e.g., an electronic controller or the like. The computer 38 includes a processor, a memory, etc. The memory of the computer 38 includes media for storing instructions executable by the processor as well as for electronically storing data and/or databases. The computer 38 is coupled to the robot body 32, e.g., mounted inside the robot body 32. The computer 38 is communicatively coupled to the sensors 34, the locomotion component 50, the actuatable components 36 (e.g., the fire extinguisher 52, the actuator 56, the automatic doors 58, the gas supply 62, etc.), and a transceiver 64, e.g., via a bus.

The apparatus 30 includes a battery 66. The battery 66 is electrically coupled to the computer 38, the sensors 34, the locomotion component 50, the actuatable components 36, and the transceiver 64. The battery 66 is coupled to the robot body 32. The battery 66 can be any suitable type for supplying power for the apparatus 30 to operate, e.g., lithium-ion batteries, nickel-metal hydride batteries, leadacid batteries, etc. The battery 66 permits the apparatus 30 to operate independently of a power supply from the vehicle 40.

The transceiver 64 may be adapted to transmit signals wirelessly through any suitable wireless communication protocol, such as Bluetooth®, WiFi, IEEE 802.11a/b/g, other RF (radio frequency) communications, etc. The transceiver 64 may be adapted to communicate with a remote server 68, that is, a server distinct and spaced from the apparatus 30. The remote server 68 may be located outside the vehicle 40. For example, the remote server 68 may be associated with a facility associated with the apparatus 30, an infrastructure component (e.g., C-V2X, V2I communications via Dedicated Short-Range Communications (DSRC) or the like), an emergency responder, a mobile device associated with the owner or operator of the vehicle 40, etc. The transceiver 64 may be one device or may include a separate transmitter and receiver.

Figure 4:
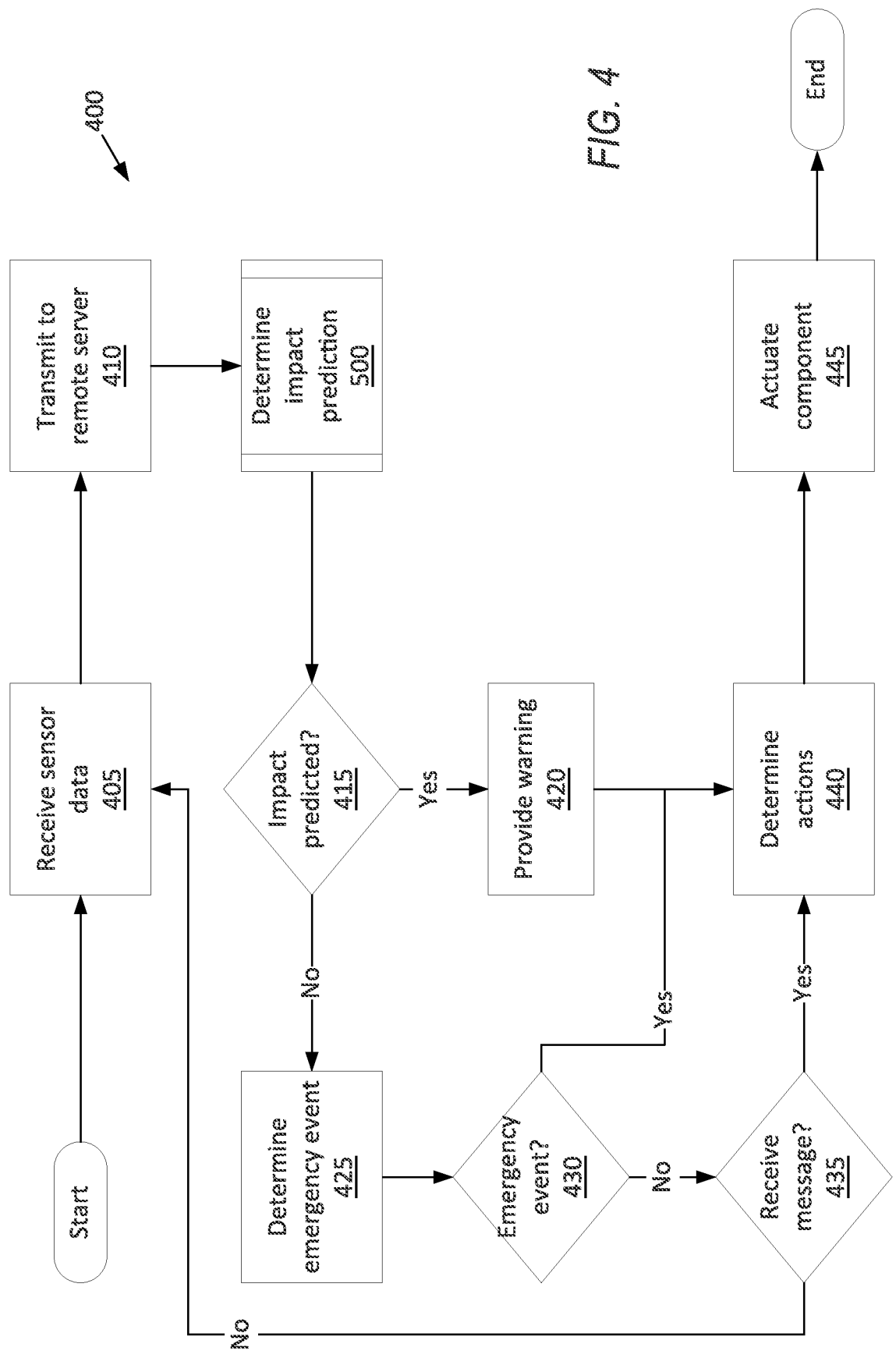
FIG. 4 is a process flow diagram of an example process for operating the robotic apparatus in response to an anomalous event.

FIG. 4 is a process flow diagram illustrating an exemplary process 400 for operating the apparatus 30 in response to an anomalous event. For the purposes of this disclosure, an "anomalous event" is defined as a sudden occurrence that raises the possibility of endangering the occupants of the vehicle 40. The memory of the computer 38 stores executable instructions for performing the steps of the process 400. As a general overview of the process 400, the computer 38 receives data from the sensors 34; transmits data to the remote server 68; in response to predicting an impact, determining an anomalous event, or receiving a message from the remote server 68, determines actions to remediate the anomalous event; and actuates one or more of the actuatable components 36 to perform the actions.

The process 400 begins in a block 405, in which the computer 38 receives data from the sensors 34. The data includes temperature data, data indicating the presence or absence of smoke, image data, audio data, location data, and kinematic data, i.e., data indicating the velocity and acceleration in linear and rotational dimensions.

Next, in a block 410, the computer 38 instructs the transceiver 64 to transmit the data received from the cameras and/or microphone of the sensors 34 to the remote server 68. The computer 38 can instruct the transceiver to transmit the data in real time, i.e., continuously transmitting the image data and audio data to the remote server 68 as the computer 38 receives the data. At the remote server 68, the data may be automatically or manually monitored.

Next, in a process 500 as more fully described below, the computer 38 predicts an imminent anomalous event, such as an impact to the vehicle 40, based on the data received from the sensors 34. The output of the process 500 is an indication of whether an anomalous event will occur and a time to anomaly, i.e., an estimated time until the anomalous event occurs.

Next, in a decision block 415, the computer 38 determines whether an anomalous event is predicted. In response to the prediction that an anomalous event will occur, the process 400 proceeds to a block 420. If there is no prediction of the anomalous event, the process 400 proceeds to a block 425.

In the block 420, the computer 38 outputs a message to occupants in the passenger cabin 42. The message can be visual, e.g., blinking lights, or auditory, e.g., a siren or a prerecorded or synthesized spoken message. After the block 420, the process 400 proceeds to a block 440.

In the block 425, the computer 38 determines whether the vehicle 40 has experienced an anomalous event based on the data received from the sensors 34. The computer 38 can determine whether the data indicates that a quantity has exceeded a threshold. For example, the computer 38 can determine from the temperature data whether a temperature of the passenger cabin 42 has exceeded a temperature threshold. The temperature threshold can be chosen to correspond to a fire occurring in the passenger cabin 42. For another example, the computer 38 can determine whether data from the smoke detector indicates that a concentration of smoke in the passenger cabin 42 has exceeded a concentration threshold. The concentration threshold can be chosen to correspond to a fire occurring in the passenger cabin 42 or to correspond to a concentration of smoke known to be dangerous. For another example, the computer 38 can determine from other sensors 34 whether a toxic gas is present. For another example, the computer 38 can determine whether acceleration data has exceeded a first acceleration threshold. The acceleration that is compared to the first acceleration threshold can be a magnitude of an acceleration vector, i.e., $$a = \sqrt{a_x^2 + a_y^2 + a_z^2},$$

in which $a_i$ is acceleration along the ith axis, x is a vehicle-forward axis, y is a vehicle-lateral axis, and z is a vehicle-vertical axis. The first acceleration threshold can be chosen to correspond to the magnitude of acceleration that occurs during an impact based on, e.g., historical accident data.

Next, in a decision block 430, the computer 38 determines whether the anomalous event occurred, e.g., whether one of the threshold values described with respect to the block 425 were exceeded. If so, the process 400 proceeds to the block 440. If not, the process 400 proceeds to a decision block 435.

In the decision block 435, the computer 38 determines whether a message has been received from the remote server 68 via the transceiver 64 instructing the computer 38 to perform a responsive action to address an anomalous event. The remote server 68 may detect that an anomalous event has occurred that the apparatus 30 is not equipped to detect, and the remote server 68 will in that case transmit a message instructing the apparatus 30 to perform an action. If the computer 38 has received the message, the process 400 proceeds to the block 440. If not, the process 400 returns to the block 405 to continue monitoring the data from the sensors 34.

In the block 440, the computer 38 determines which actions to perform to address the anomalous event. The block 440 occurs after the block 420 if an anomalous event was predicted, after the decision block 430 if an anomalous event was determined to have occurred, or after the decision block 435 if the computer 38 received a message from the remote server 68 instructing the computer 38 to perform an action. The computer 38 determines the action based on the data from the sensors 34 or based on the message from the remote server 68. If the anomalous event is predicted rather than having already occurred, then the computer 38 can wait for the time to anomaly before acting.

If the data from the sensors 34 indicate that a fire is occurring in the passenger cabin 42, the computer 38 determines to actuate the fire extinguisher 52. For example, data indicating a fire can include temperature data indicating that the temperature of the passenger cabin 42 is above the temperature threshold. The temperature threshold can be the same temperature threshold as used in the block 425. For another example, data indicating a fire can include data from the smoke detector indicating that the concentration of smoke in the passenger cabin 42 is above a first concentration threshold. The first concentration threshold can be chosen to correspond to a fire occurring in the passenger cabin 42. For another example, the sensors 34 can include an infrared camera, and data from the infrared camera can indicate a hot spot above a temperature threshold.

If the data from the sensors 34 indicate the presence of smoke in the passenger cabin 42, the computer 38 determines to provide the breathing masks 60 to the occupants and/or provide an exit for occupants from the passenger cabin 42. For example, data indicating smoke can include data from the smoke detector indicating that the concentration of smoke in the passenger cabin 42 is above a second concentration threshold. The second concentration threshold can be chosen to correspond to a concentration of smoke known to be dangerous to an occupant. (The concentration threshold discussed with respect to the block 425 can be the smaller of the first concentration threshold and the second concentration threshold.) For another example, data indicating smoke can include image data from a camera of the sensors 34 indicating the presence of smoke. The image data can indicate smoke by, for example, exhibiting a haziness above a threshold. Alternatively, the computer 38 can identify the smoke using conventional image-recognition techniques, e.g., a convolutional neural network programmed to accept images as input and output a score for smoke. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential type of object, and the final output is "smoke" if smoke has the highest score.

If the data from the sensors 34 indicate that the vehicle 40 is immobilized, the computer 38 determines to provide an exit for occupants from the passenger cabin 42. For example, the computer 38 can determine whether the acceleration data has exceeded a second acceleration threshold. The acceleration that is compared to the acceleration threshold can be a magnitude of an acceleration vector, i.e., $$a = \sqrt{a_x^2 + a_y^2 + a_z^2},$$

in which $a_i$ is acceleration along the ith axis, x is a vehicle-forward axis, y is a vehicle-lateral axis, and z is a vehicle-vertical axis. The second acceleration threshold can be chosen to correspond to the magnitude of acceleration that occurs during an impact that likely renders the vehicle 40 immobile, based on historical accident data. The second acceleration threshold can be greater than the first acceleration threshold from the block 425.

Next, in the block 445, the computer 38 actuates the actuatable components 36 to remediate the anomalous event by performing the actions selected in the block 440. If the computer 38 has determined to actuate the fire extinguisher 52, the computer 38 actuates the locomotion component 50 to move the apparatus 30 so that the apparatus 30 is close to the fire and the fire extinguisher 52 is aimed at the fire. To do so, the computer 38 can use data from the sensors 34 such as cameras to identify and locate the fire using object-recognition algorithms. The computer 38 then actuates the fire extinguisher 52 to release the expellant and firefighting agent.

If the computer 38 has determined to provide an exit for occupants from the passenger cabin 42, the computer 38 actuates the locomotion component 50 to move the apparatus 30 so that the apparatus 30 is close to one of the windows and the striker 54 is aimed at the window. To do so, the computer 38 can use data from the sensors 34 such as cameras to identify and locate the window using object-recognition algorithms. The computer 38 then actuates the actuator 56 to launch the striker 54 at the window.

If the computer 38 has determined to provide the breathing masks 60 to the occupants, the computer 38 actuates the locomotion component 50 to move the apparatus 30 near one of the occupants. To do so, the computer 38 can use data from the sensors 34 such as cameras to identify and locate the occupants. The computer 38 can actuate the locomotion component 50 to move the apparatus 30 consecutively to each occupant. At the same time, the computer 38 actuates the automatic doors 58 to open and reveal the breathing masks 60 and the defibrillator 70, and the computer 38 actuates the gas supply 62 to provide oxygen to the breathing masks 60.

After the block 445, the process 400 ends.

Figure 5:
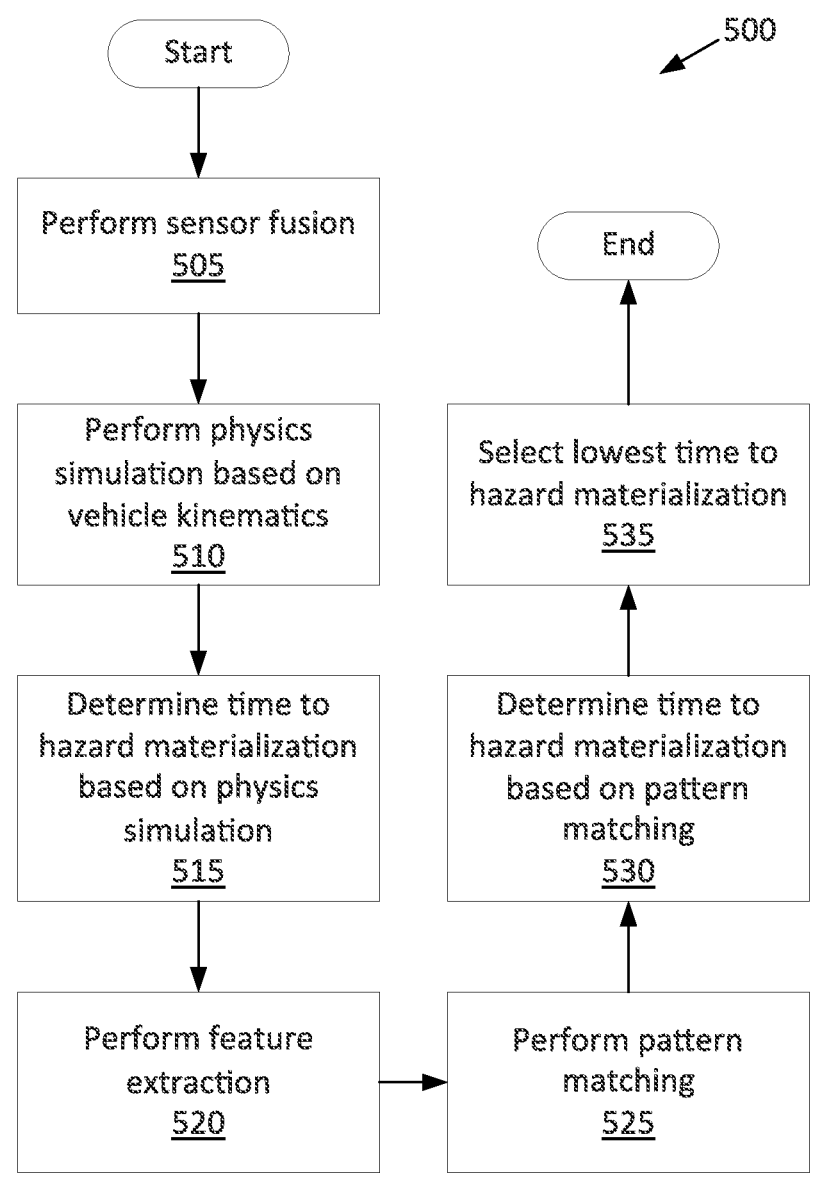
FIG. 5 is a process flow diagram of an example process for predicting an impact to the vehicle.

FIG. 5 is a process flow diagram illustrating an exemplary process 500 for predicting an impact to the vehicle 40. The memory of the computer 38 stores executable instructions for performing the steps of the process 500. As a general overview of the process 500, the computer 38 performs sensor fusion in block 505, determines a first time to anomaly based on vehicle kinematics in blocks 510-515, determines a second time to anomaly based on pattern matching of sensor data in blocks 520-530, and selects the lowest time to anomaly in block 535. A "time to anomaly" is a length of time until a hazard occurs. The determinations of the first time to anomaly and the second time to anomaly are performed independently of each other, and the blocks 510-515 can be performed before, after, or in parallel with the blocks 520-530.

The process 500 begins in a block 505, in which the computer 38 performs sensor fusion of the data received from the sensors 34 in the block 405. Sensor fusion is combining data from disparate sources together so that the resulting data has less uncertainty than if the data from each source were used individually. The sensor fusion can be low, medium, high, or multiple level. The sensor fusion can be performed with one or more algorithms, e.g., Kalman filter, central limit theorem, Bayesian networks, Dempster-Shafer, convolutional neural networks, etc.

Next, in a block 510, the computer 38 generates a physics model describing a state of the vehicle 40. The current state of the vehicle 40 can be described in with a set of kinematic variables, e.g., $(x_x, x_y, x_z, v_x, v_y, v_z, a_x, a_y, a_z, \theta_x, \theta_y, \theta_z, \omega_x, \omega_y, \omega_z, \alpha_x, \alpha_y, \alpha_z)$, in which $x_i$ is position along the ith axis, $v_i$ is velocity along the ith axis, $a_i$ is acceleration along the ith axis, $\theta_i$ is angular position about the ith axis, $\omega_i$ is angular velocity about the ith axis, and $\alpha_i$ is angular acceleration about the ith axis, x is a vehicle-forward axis, y is a vehicle-left axis, and z is a vehicle-vertical axis. The kinematic variables can be determined from the acceleration data, e.g., by dead reckoning, as well as by location data such as GPS data.

Next, in a block 515, the computer 38 determines whether conditions indicate a likely impact and, if so, estimates a first time to anomaly. The conditions are combinations of values for subsets of the kinematic variables indicating that an impact is likely. For example, a value of angular acceleration $\alpha_x$ above a threshold can indicate that the vehicle 40 may tip over sideways, a value of lateral velocity $a_y$ above a threshold can indicate that the vehicle 40 is skidding sideways, etc. For each condition, a corresponding first time to anomaly can be stored in the memory of the computer 38, e.g., in a lookup table. The various first times to anomaly can be chosen based on physics modeling, historical accident data, etc. If none of the conditions are met, then the first time to anomaly is set to infinity or to an arbitrary value several times greater than the greatest first time to anomaly in the lookup table.

Next, in a block 520, the computer 38 performs feature extraction on the fused sensor data. Feature extraction is picking out the potentially important features and eliminating less useful and redundant data. A feature is an individual measurable property or characteristic of a phenomenon being observed. Features can be determined using general dimensionality reduction techniques such as independent component analysis, latent semantic analysis, principal component analysis, multifactor dimensionality reduction, nonlinear dimensionality reduction, multilinear subspace learning, etc. Alternatively or additionally, features can be chosen by designers based on knowledge that the feature can indicate an impending impact to the vehicle 40.

Next, in a block 525, the computer 38 performs pattern matching on the features to determine whether an impact will likely occur. The pattern matching/recognition is based on a model created by a machine learning process, e.g., regression, classification, clustering, principal component analysis, ensemble learning, Bayesian networks, Markov random fields, sequence labeling, etc. The machine-learning model can be trained on naturalistic driving studies and accident databases maintained by, e.g., the Strategic Highway Research Program 2 (SHRP2), the German In-Depth Accident Study (GIDAS), the China In-Depth Accident Study (CIDAS), the National Highway Traffic Safety Administration (NHTSA), etc. The model includes a set of patterns, and the output of the pattern matching is which pattern the fused sensor data most closely resembles.

Next, in a block 530, the computer 38 estimates a second time to anomaly based on which pattern was outputted in the block 525. A lookup table can store second times to anomaly corresponding to the patterns. The second times to anomaly can be chosen based on the naturalistic driving studies and accident databases maintained by, e.g., SHRP2, GIDAS, CIDAS, NHTSA, etc. For patterns representing situations in which impacts did not occur, the second time to anomaly can be set to infinity or to an arbitrary value several times greater than the greatest second time to anomaly in the lookup table.

Next, in a block 535, the computer 38 selects the shorter of the first time to anomaly and the second time to anomaly as the time to anomaly. The time to anomaly can represent whether an impact is predicted based on the magnitude of the time to anomaly. If the time to anomaly is as great as the arbitrary large values chosen to non-impact situations in the blocks 515 and 530, then an impact is not predicted; if the time to anomaly is shorter, then an impact is predicted. After the block 535, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An apparatus comprising:
a robot body;
at least one sensor coupled to the robot body and positioned to receive stimuli from a passenger cabin of a vehicle;
an actuatable component coupled to the robot body; and
a computer coupled to the robot body and communicatively coupled to the sensor and the actuatable component;
wherein the computer is programmed to:
receive data from the at least one sensor gathered while the robot body and the at least one sensor are positioned inside the passenger cabin of the vehicle;
predict an imminent anomalous event in the vehicle based on the data from the at least one sensor; and
in response to the prediction, actuate the actuatable component to remediate the anomalous event.

2. The apparatus of claim 1, wherein remediating the anomalous event includes providing an exit for occupants from the passenger cabin.

3. The apparatus of claim 1, wherein remediating the anomalous event includes extinguishing a fire.

4. The apparatus of claim 1, wherein the apparatus is unattached to the vehicle.

5. The apparatus of claim 1, further comprising a locomotion component coupled to the robot body.

6. The apparatus of claim 5, wherein the locomotion component includes at least one of wheels, tracks, or legs.

7. The apparatus of claim 1, wherein the actuatable component includes a fire extinguisher.

8. The apparatus of claim 1, wherein the actuatable component includes an actuator and a striker movable by the actuator relative to the robot body, wherein the actuator is equipped to move the striker at a sufficiently high speed relative to the robot body to break tempered glass.

9. The apparatus of claim 1, further comprising a plurality of breathing masks detachably attached to the robot body.

10. The apparatus of claim 1, wherein the at least one sensor includes a temperature sensor.

11. The apparatus of claim 1, wherein the at least one sensor includes a smoke detector.

12. The apparatus of claim 1, further comprising a transceiver coupled to the robot body and communicatively coupled to the computer, wherein the at least one sensor includes a camera, and the computer is further programmed to instruct the transceiver to transmit data received from the camera to a remote server.

13. The apparatus of claim 12, wherein the computer is further programmed to instruct the transceiver to transmit the data received from the camera to the remote server in real time.

14. The apparatus of claim 12, wherein the computer is further programmed to, in response to a message from the remote server, actuate the actuatable component to provide an exit for occupants from the passenger cabin or to extinguish a fire.

15. The apparatus of claim 1, further comprising a battery coupled to the robot body and electrically coupled to the computer, the at least one sensor, and the actuatable component.

16. A computer comprising a processor and a memory storing instructions executable by the processor to:
receive data from at least one sensor mounted to an apparatus gathered while the apparatus and the at least one sensor are positioned inside a passenger cabin of a vehicle, wherein the apparatus is unattached to the vehicle;
predict an imminent anomalous event in the vehicle based on the data received from the at least one sensor; and
in response to the prediction, actuate an actuatable component of the apparatus to remediate the anomalous event.

17. An apparatus comprising:
a robot body;
means for moving the robot body around inside a passenger cabin of a vehicle;
at least one sensor mounted to the robot body;
means, mounted to the robot body, for remediating the anomalous event; and
a computer programmed to:
receive data from the at least one sensor gathered while the robot body and the at least one sensor are positioned inside the passenger cabin of the vehicle;
predict an imminent anomalous event in the vehicle based on the data from the at least one sensor; and
upon predicting the imminent anomalous event, activate the means for remediating the anomalous event.

18. The apparatus of claim 17, further comprising means for protecting occupants of the passenger cabin from smoke.

19. The apparatus of claim 17, wherein the means for moving the robot body around is independent of the vehicle, the means for predicting the imminent anomalous event is independent from the vehicle, and the means for remediating the anomalous event is independent from the vehicle.

20. The apparatus of claim 1, wherein the imminent anomalous event is a future event when predicted.

* * * * *